Figure 1:
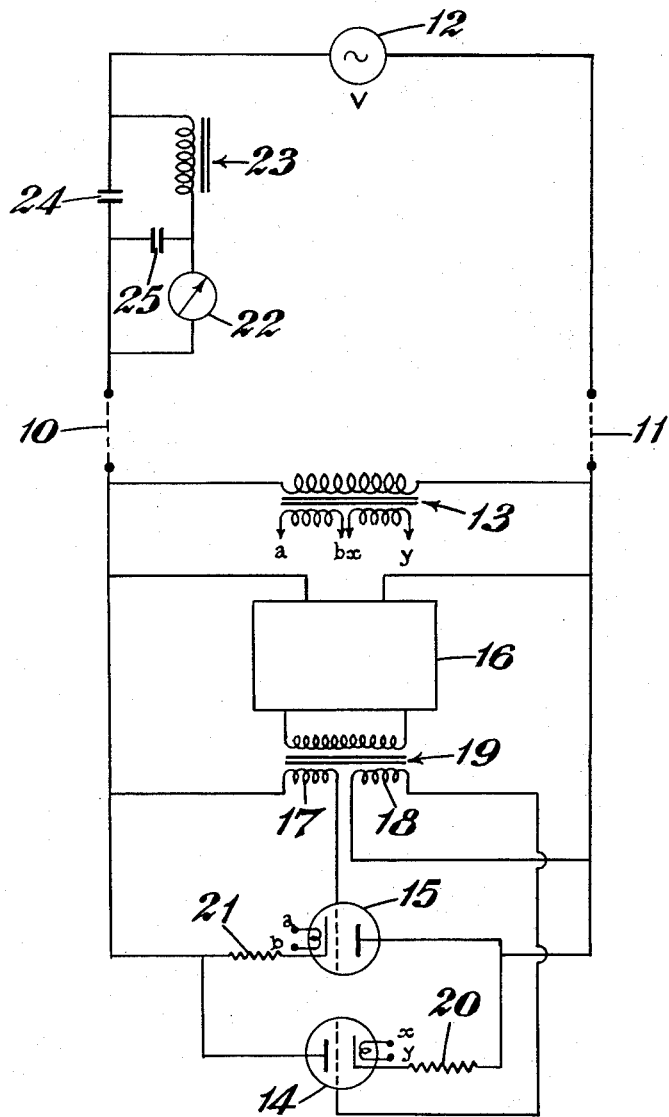

June 5, 1956

P. THREADGOLD 2,749,534

TELEMETERING

Filed Dec. 24, 1953

3 Sheets-Sheet 1

INVENTOR:
PHILIP THREADGOLD

BY: Morgan, Finnegan, Durham & Pine
ATTORNEYS

June 5, 1956  P. THREADGOLD  2,749,534
TELEMETERING
Filed Dec. 24, 1953  3 Sheets-Sheet 2

Fig. 2.

(a.) Supply Volts 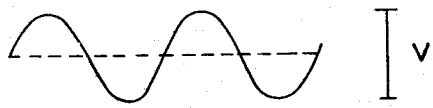 $V$ (b.) Zero Signal Current Valve 14  $i_o$ (c.) Zero Signal Current Valve 15  $i_o$ (d.) Grid Signal Voltage Valve 14 and 15 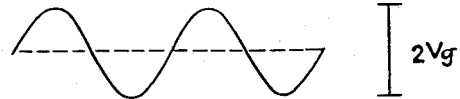 $2V_g$ (e.) Anode current valve 14 with signal  $i_o + g_m V_g$ (f.) Anode current valve 15 with signal 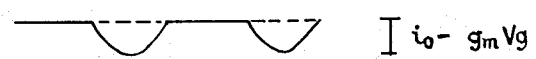 $i_o - g_m V_g$ (g.) Total anode current 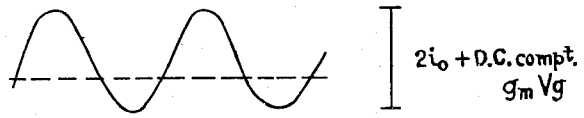 $2i_o + \text{D.C. compt.}\ g_m V_g$ INVENTOR:
PHILIP THREADGOLD
BY: *Morgan, Finnegan, Durham & Pine*
ATTORNEYS:

United States Patent Office 2,749,534
Patented June 5, 1956

2,749,534
TELEMETERING

Philip Threadgold, Nottingham, England, assignor to The British Petroleum Company Limited Application December 24, 1953, Serial No. 400,273

Claims priority, application Great Britain January 9, 1953

3 Claims. (Cl. 340—177)

This invention relates to telemetering by which is meant, generally, the reproduction at a convenient location of measurements made at a remote point.

The need for an efficient and accurate telemetering system which will convert a four terminal measuring network into a two line transmission system has been apparent for some considerable time. The basic requirements of such a system are that it must be virtually independent of the line characteristics and if possible should present a constant A. C. impedance to it. I have now developed such a telemetering system which satisfies the above requirements.

According to the invention, a telemetering system for measuring the output signal of an A. C. energised electrical measuring network comprises a pair of conductors (hereinafter referred to as "the line") between the measuring network and the point where it is desired to receive the signal, the line being supplied with a substantially constant alternating voltage which provides the supply to the measuring network the output signal of which is transformer fed from two equal secondary windings between the grids and cathodes of two valves which are connected in parallel across the line, anode to cathode, at the same end as the measuring network, the connections being arranged so that the grid signals of the two valves are in phase with each other whereby the grid of one valve is positive going during its conducting half cycle and the grid of the other valve is negative going during its conducting half cycle, whereby there is produced in the line a flow of direct current which is proportional to the signal to be measured, which direct current is measured at the receiving end of the line.

The direct current may conveniently be measured by means of a direct current measuring instrument provided with a filter to bypass the alternating current. One of the two conductors constituting the line may be earth.

The system is particularly suitable for use with a four terminal network, such as a Wheatstone bridge, the impedance of one arm of which is controlled by the magnitude of the variable being measured so that the output signal from the four terminal network corresponds to the magnitude of the variable.

The output signal from the measuring network may be applied to the grids of the valves either in phase or in antiphase with the supply voltage, the only difference being that in the one case the D. C. flows in one direction and in the other case it flows in the opposite direction.

Since the impedance of the system is constant and the telemetering signal is independent of the A. C. characteristics of the line, existing A. C. power transmission lines may be used as the line.

Figure 3:
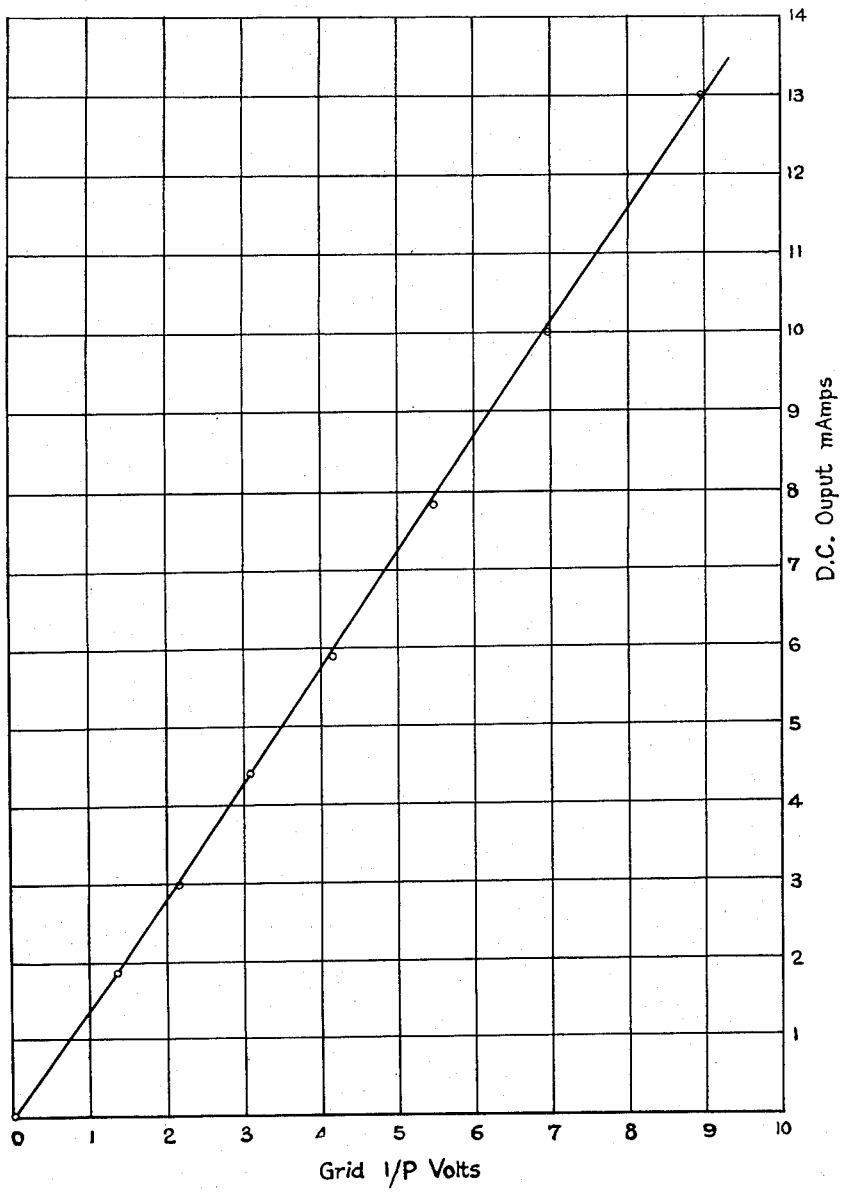

The invention will now be described by way of example with reference to the accompanying drawings in which Fig. 1 is a circuit diagram of the telemetering system, Fig. 2 (a, b, c, d, e, f and g) shows a series of waveforms which illustrate the action of the circuit, and Fig. 3 shows the calibration curve of a telemeter according to the invention.

Referring first to Fig. 1, the line consists of conductors 10 and 11 and is supplied with a constant alternating voltage by generator 12 which provides the supply to a heater transformer 13 for two valves 14 and 15 and also to a four terminal measuring network 16. The two valves 14 and 15 are connected across the line anode to cathode. The output signal from the four terminal measuring network 16 is fed from two equal secondary windings 17 and 18, on transformer 19, between the grids and cathodes of valves 14 and 15 the connections being arranged so that the grid signals of the two valves are in phase with each other. Cathode resistances 20 and 21 are required to prevent the grid of each valve going positive with respect to the cathode which would result in a flow of grid current. In some conditions series grid stopper resistances are needed to prevent parasitic oscillations.

The action of the circuit can easily be followed by reference to Fig. 2. Under zero signal conditions each valve conducts for the half cycle during which its anode is positive with respect to its cathode. Hence there is an A. C. current flow through the telemeter circuit having a peak value $i_0$. If a signal of peak value $V_g$ is applied to the grids of valves 14 and 15 in phase with the supply voltage then the grid of valve 14 is positive going during its conducting half cycle when the anode is positive going and the valve passes a current having a peak value of $i_0 + g_m V_g$ where $g_m$ is the mutual conductance of the valve (Fig. 2e). On the other hand the grid of valve 15 is negative going during its conducting half cycle and hence the current passed by this valve has a peak value of $i_0 - g_m V_g$ (Fig. 2f). Thus the total A. C. current passed by the device when a signal is applied remains at its original peak value $i_0$, but in addition a D. C. signal current flows having a value equal to $g_m V_g$. The D. C. signal is monitored by means of a suitable D. C. milliammeter 22 (Fig. 1) provided with a simple filter, consisting of choke 23 and condensers 24 and 25, to bypass the standing A. C. down line.

It is clear from the above analysis that the device will work equally well if the grids are fed in antiphase with the supply, the only alteration being that the roles of valves 14 and 15 are interchanged with a consequent reversal of the direction of the D. C. current flow.

The interchanging of the roles of the two valves by the reversal of phase of the grid input signals gives an alternative use of the circuit as a phase sensitive device, whereby the output from the four terminal network can be of constant amplitude and of varying phase with respect to the supply voltage. The D. C. detector would then be a centre zero meter calibrated from 0 to ±180°.

The calibration curve in Figure 3 was obtained using two Mullard EL33's with cathode resistors of 220 ohms and grid stoppers of 1 megohm. The voltage supply was taken from the A. C. mains.

The system is easily constructed, is robust and uses few components which are simple, small, rugged, inexpensive and easily obtainable. Its operating conditions are not at all critical, hence it is ideal where trouble free running is essential. The fact that it presents a constant impedance to line means that any number of A. C. operated linear devices can be wired in parallel across the line, the only condition being that their D. C. resistance must be high compared with the total line resistance looking into the generator and D. C. detector. The return signal is D. C. and hence depends only on the D. C. resistance looking into the line, and is completely independent of the A. C. characteristics of the line.

The applications of the device are numerous. For example, it could be employed where a continuous record of fluid level variations is required in tanks that are automatically bled off by means of an A. C. operated valve system. The line used would then be that carrying the main A. C. supply to the automatic bleed system.

I claim:

1. A telemetering system for measuring the output signal of an A. C. energised electrical measuring network, comprising a line, consisting of a pair of conductors, between the measuring network and the point where it is desired to receive the signal, the line being supplied with a substantially constant alternating voltage which provides the supply to the measuring network, a pair of valves connected in parallel across the line, anode to cathode, at the same end as the measuring network, a transformer fed by the output signal of the measuring network and having two equal secondary windings which are connected between the grids and cathodes of the two valves, one to each, the connections being so arranged that the grid signals of the two valves are in phase with each other whereby the grid of one valve is positive going during its conducting half cycle and the grid of the other valve is negative going during its conducting half cycle, whereby there is produced in the line a flow of direct current which is proportional to the signal to be measured, and means for measuring the direct current at the receiving end of the line.

2. A telemetering system according to claim 1, wherein the means for measuring the direct current comprises a D. C. measuring instrument provided with a filter to by-pass the A. C.

3. A telemetering system according to claim 1 wherein one of the two conductors constituting the line is earth.

References Cited in the file of this patent

FOREIGN PATENTS 481,013    Canada _____ Feb. 12, 1952